United States Patent Office 3,490,899
Patented Jan. 20, 1970

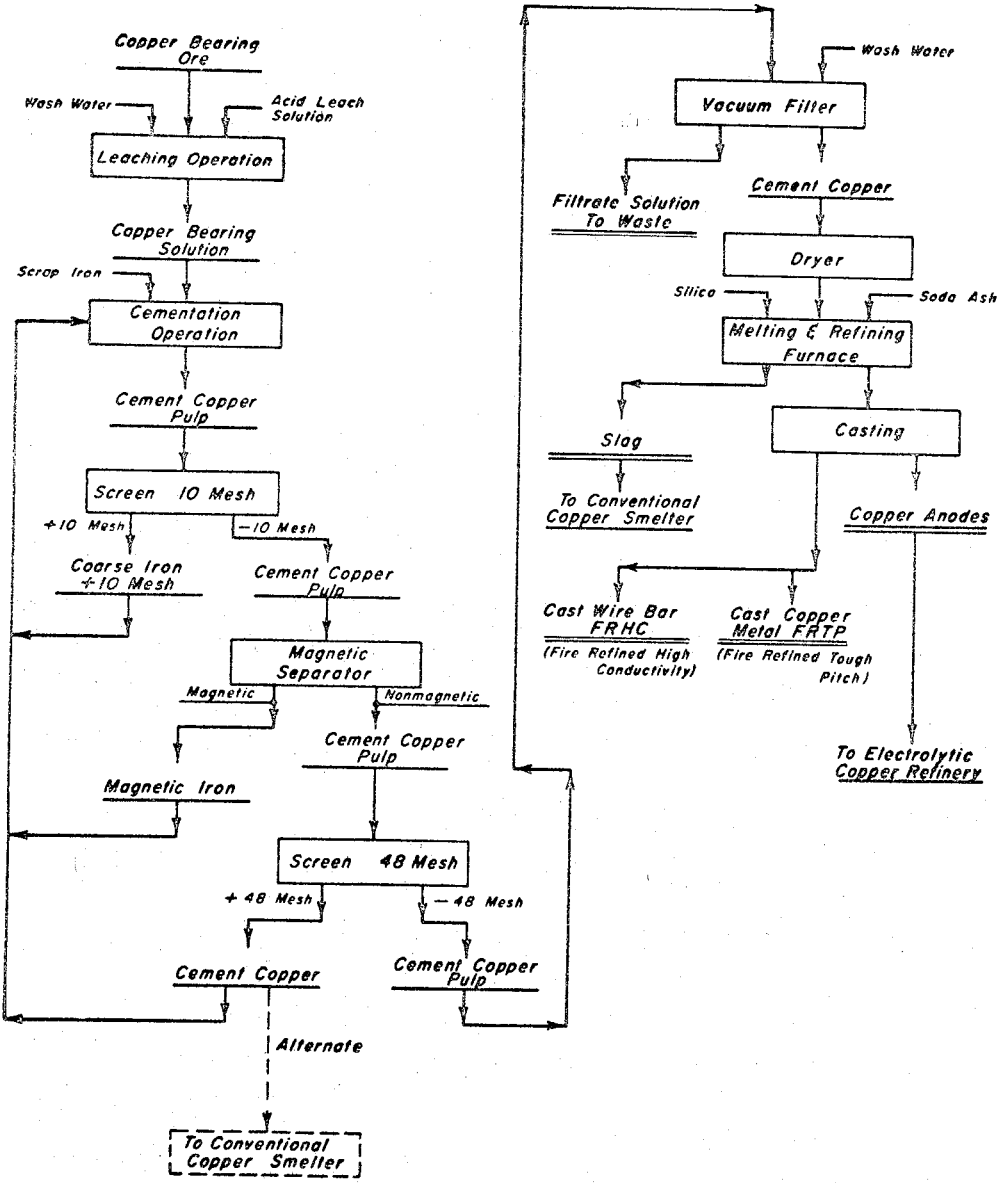
William A. Krivsky
Earl L. Rau
Vsevolod Archipov
INVENTORS

3,490,899
REFINED COPPER AND PROCESS THEREFOR
William A. Krivsky, New Canaan, Conn., and Earl L.
Rau, Arvada, and Vsevolod Arhinov, Denver, Colo.,
assignors, by mesne assignments, to Continental Copper
and Steel Industries, Inc., a corporation of New York
Filed Oct. 18, 1966, Ser. No. 587,443
Int. Cl. C22b 15/12
U.S. Cl. 75—109                                    2 Claims

ABSTRACT OF THE DISCLOSURE

An improved cementation copper recovery process which includes a step of preparing a non-magnetic cementation copper pulp prior to a final screening and filtering step. The process results in a cementation copper of a purity much higher than that recovered in other prior art processes.

This invention relates to precipitated or cement copper and a process for producing this copper of such quality that it may be used in direct fire refining to produce copper of at least anode quality.

One of the two major types of copper ores found in the world is generally classified as oxide ore. Much of this ore, while highly necessary to the world's commerce, is quite low in copper content. Unlike the other major type of ore deposit, viz., sulfide ores, the oxide ores are not capable of being processed through the usual flotation processes and sulfide smelting operations. Therefore, at times the oxide ores are leached into solutions, and these solutions are processed by electrowinning wherein the solution is placed in a cell containing an anode and a cathode and by the passage of current copper is deposited on the copper cathode. This method of processing has often been uneconomic and there are few commercial electrowinning plants in the world. Furthermore, where the oxide ore is not capable of producing a solution having at least 15 grams of copper per liter, the copper has not been economically electrowon. Another factor for consideration is that it is extremely expensive to transport low grade ores and dilute solutions resulting therefrom over large distances and therefore this has not been done.

As a consequence, the oxide ores and waste material accumulated during the mining and other processing of sulfide ores containing oxides have heretofore been made into solutions by leaching operations, including percolation leaching, agitation leaching, heap leaching, dump leaching, and in situ leaching. These solutions are generally dilute ore and have been treated with scrap iron to precipitate a finely divided form of copper, which has, over the years, become known as cement copper.

Usually, the precipitation is carried out in launders or ditches filled with scrap iron. When it is desired to remove the precipitant, the flow of the solution is stopped, and the iron lifted from the launders or ditches by magnetic cranes or other suitable means. The precipitate, which has fallen to the bottom of the ditch, is then either shoveled or sluiced out. Another means of precipitating copper from solutions is to flow the solution over scrap iron placed in rotating tumblers. In this operation, the precipitated copper falls from the tumbler into a pit which is periodically emptied. However, the cement copper produced is of low grade containing only between 40 and 80 percent copper and could not heretofore be used in direct fire refining. As a consequence, much of the low grade ore which might be used to produce cement copper is not exploited, despite the extreme shortages of copper which have repeatedly occurred. In only two instances has this inherently valuable ore been in any way used in the preparation of copper, and in both of these instances only as a minor additive to the production of commercial copper.

In one instance minor amounts of cement copper have been added during the smelting of sulfide ores and concentrates. Only limited amounts of cement copper can be accommodated during the smelting process.

Small amounts of cement copper obtained from oxide ores have also been used in the processing of copper by electrowinning cells. The cement copper is not introduced into the main system, but is, instead, dissolved and then introduced in minor amounts in the return line to enrich the returning solution. As a consequence, prior to this invention, huge quantities of very low grade oxide ore, capable of producing cement copper, have not received full exploitation.

It has been long a problem of the copper industry to attempt to make some use, on a commercial scale, of cement copper in view of the condition of the deposits of copper in the world and the economic demand and necessity for copper.

It is, therefore, the object of the present invention to produce a cement copper of such grade that it may be used in a direct fire refining operation to produce a copper metal product of at least anode quality.

It is another object of the present invention to provide means for up-grading oxide copper by the elimination of impurities prior to melting.

Still another further object of the present invention is to provide a cement copper material, which is simple and economical to produce and yet easy to melt and refine.

Still a further object of the present invention is to up-grade the cement copper charged to the fire refining furnace to reduce the quantity of slag produced therein.

Yet another object of the present invention is to enable the preparation of cement copper at the mine site, which may be easily shipped for processing to other places throughout the world, to be usable directly in a fire refining furnace to produce copper of at least anode quality.

It has been found, in accomplishing all of the foregoing objectives, that the use of this invention also has provided a high grade conductivity copper, which can be used to produce electrical copper wire.

In accordance with the present invention, the copper-bearing solution is produced in the usual way, that is, by a leaching operation. In one exemplary form of this process the oxide ore is crushed to small-size pieces which are then leached by a sulfuric acid solution as part of an upflow percolation process. In following the invention, it is desirable to control the pH of the pregnant solution to a pH of between approximately 1 and 3. This step aids in providing the high-grade cement copper accomplished by the process. The resultant copper-bearing acid solution is then precipitated with scrap iron and may be accomplished in the conventional launder ditch. However, it is preferred that the precipitation be carried out in a tumbler or Falltrommel cementation vessel because of the rapidity with which the precipitation may be accomplished and the ability to exercise greater controls. A feature of the invention is that the scrap iron used in the precipitation step may be of any conventional and convenient inexpensive type, such as untreated shredded autobody iron, which is commercially available in large quantities, and the copper solution utilized may be produced from low grade copper ore.

Usually, after the aforesaid precipitation process, the resulting solution containing cement copper is passed through a screen with relatively large openings to remove the unconsumed coarse scrap iron. The resultant cement copper has heretofore usually been washed by dilution and allowed to settle, with the solution being decanted from the cement copper and the cement copper partially air dried. The commercial cement copper so prepared is of low grade, containing between 40 to not more than approximately 80 percent copper content, and it has not been economically feasible to obtain any usable copper product by direct fire refining. As a consequence, the cement copper produced from oxide ores has been shipped to the few large companies that own the sulfide smelting operations at a price which reflects substantial freight and smelting charges. Therefore, large quantities of available low grade ore has not been exploited or produced, even into cement copper.

In accordance with the present invention, however, cement copper is produced, which is appropriate for direct fire refining, with the obvious consequent economic benefits. One step in accomplishing this result is magnetic separation. This may be done before or after the screening process hereinafter described. To separate the copper a magnetic separator in the form of a drum or belt separator may be utilized, which divides the incoming cement copper into two parts. In doing this, iron is removed from the cement copper. The major constituent of the cement copper pulp is nonmagnetic copper-bearing, and when the small amount of iron is separated therefrom the entire cement copper pulp is nonmagnetic. In following this step, additional benefits are derived for the reason that the separated part of the incoming cement copper, which is magnetic, contains metallic iron which can be reutrned to the cementation system to be used again. Any copper retained in the magnetic material would, as a result, also be recycled and eventually recovered as part of the nonmagnetic cement copper pulp.

Another step in the processing of the cement copper to acquire the fine grade accomplished is the screening of the nonmagnetic copper pulp. In this operation, which may take place either before or after the magnetic separation, the screen mesh is relatively finer and, if desired, a vibrating screen may be utilized, although it will be understood that the mesh may vary depending upon the nature of the incoming cement copper. Here, again, certain solids which are recovered from the screening operation may be recycled to other parts of the process.

The process for the provision of the desired grade of cement copper is carried on in continuous fashion, and the next and important step is the vacuum filtering of the cement copper. As indicated, in following the present invention, the cement copper produced after the aforedescribed screening operation is placed in a vacuum filter, and the solution removed substantially completely therefrom. If desired, the cement copper may then be washed with water on the vacuum filter and permitted to dry. While not required, the cement copper pulp may be stirred during the drying process in order to reduce the time consumed.

The cement copper produced by the process of this invention may be introduced directly into a furnace for direct fire refining. The resultant purity of copper has been found to be higher grade than anode quality, and, in fact, highly conductive copper has been produced, from which it is possible to draw electrical copper wire. It is to be understood that, in following the process of the present invention, the melting and fire refining procedure was in accordance with known fire refining practices, utilizing, if desired, certain known reducing agents, such as coke.

As aforesaid, the grade of copper provided after the original precipitation process was of low grade and if not further processed, would assay in the range of 40 to 80 percent copper. In a plurality of melts of the cement copper produced with the use of the present invention, the copper obtained was between the ranges shown by an electrochemical analysis as follows: Cu, percent, 99.660–99.891.

In order to facilitate an understanding of this invention, a flowsheet is set forth in the FIGURE 1. As shown in the flow-sheet, which is a specific illustration of the present invention, the process utilized was as follows: Three-eighths inch size copper oxide ore was placed in a barrel to be used as upward percolation leach vessels. The ore was leached with $H_2SO_4$, with a final water wash. The pregnant solution to precipitation had a pH of 1.5. The pregnant copper solution was then cemented in a tumbler which was rotated at an inclined angle. Autobody scrap iron was used to precipitate the cement copper.

| Product | Chemical Analysis, Percent | | | | | | | | | | |
|---|---|---|---|---|---|---|---|---|---|---|---|
| | Cu | $O_2$ | Fe | Ni | As | Sb | Bi | Pb | Se | Te | Sn |
| Cement Copper processing: | | | | | | | | | | | |
| Magnetic Iron | 39.10 | 17.1 | 41.4 | | | | | | | | |
| Cement Cu, −10+48M | 94.65 | 2.9 | 2.04 | 0.016 | 0.004 | 0.003 | 0.001 | 0.005 | 0.005 | 0.003 | |
| Cement Cu, −48M | 92.60 | 5.5 | 1.30 | 0.002 | 0.004 | 0.003 | 0.001 | 0.006 | 0.005 | 0.003 | |
| Melting and Fire Refining, Melt No. 1: | | | | | | | | | | | |
| Metal | *99.660 | 0.24 | 0.001 | 0.010 | 0.002 | 0.003 | 0.001 | 0.005 | 0.005 | 0.003 | 0.001 |
| Silicate Slag (computed) | 58.64 | | 5.74 | 0.023 | | | | | | | |
| Silicate Slag, metallic | 89.21 | | 0.23 | 0.014 | | | | | | | |
| Silicate Slag, nonmetallic | 43.22 | | 8.52 | 0.029 | | | | | | | |
| Carbonate Slag (computed) | 53.48 | | 1.56 | | 0.002 | 0.003 | | | | | |
| Carbonate Slag, Metallic | 89.04 | | 0.42 | | 0.002 | 0.003 | | | | | |
| Carbonate Slag, nonmetallic | 21.97 | | 2.60 | | 0.002 | 0.003 | | | | | |
| Melting and Fire Refining, Melt No. 2: | | | | | | | | | | | |
| Metal | *99.891 | 0.06 | 0.0005 | 0.009 | 0.002 | 0.003 | 0.001 | 0.005 | 0.005 | 0.003 | 0.0 |
| Silicate Slag (computed) | 54.32 | | 6.45 | 0.010 | | | | | | | |
| Silicate Slag, metallic | 92.07 | | 0.68 | 0.006 | | | | | | | |
| Silicate Slag, nonmetallic | 53.93 | | 6.51 | 0.019 | | | | | | | |
| Carbonate Slag (computed) | 10.65 | | 3.37 | | 0.002 | 0.003 | | | | | |
| Carbonate Slag, metallic | 21.62 | | 3.39 | | 0.002 | 0.003 | | | | | |
| Carbonate Slag, nonmetallic | 7.99 | | 3.36 | | 0.002 | 0.003 | | | | | |

*Electro-Chemical Analysis.

MATERIAL DISTRIBUTION

| Product | Weight, grams | Weight, percent | Chemical Analysis, Percent | | | Percent Distribution | | |
|---|---|---|---|---|---|---|---|---|
| | | | Cu | $O_2$ | Fe | Cu | $O_2$ | Fe |
| Cement Copper Processing: | | | | | | | | |
| Cement Cu Crude (computed) | 8038.5 | 100.0 | 92.29 | 5.49 | 1.61 | 100.0 | 100.0 | 100.0 |
| Magnetic Iron | 57.9 | 0.7 | 39.10 | 17.1 | 41.4 | 0.3 | 2.3 | 18.5 |
| Cement Cu, −10+48M | 280.6 | 3.5 | 94.65 | 2.9 | 2.04 | 3.6 | 1.8 | 4.4 |
| Cement, Cu, −48M | 7700.0 | 95.8 | 92.60 | 5.5 | 1.30 | 96.1 | 95.9 | 77.1 |
| Melting and Fire Refining, Melt No. 1: | | | | | | | | |
| Head (computed) | | 100.0 | | | | 100.0 | | 100.0 |
| Metal | 3428.0 | 77.5 | 99.660 | 0.24 | 0.001 | 85.7 | | 0.1 |
| Silicate Slag | 755.0 | 17.1 | 58.64 | | 5.74 | 11.1 | | 92.0 |
| Carbonate Slag | 242.0 | 5.4 | 53.84 | | 1.56 | 3.2 | | 7.9 |
| Melting and Fire Refining, Melt No. 2: | | | | | | | | |
| Head (computed) | | 100.0 | | | | 100.0 | | 100.0 |
| Metal | 2412.0 | 80.4 | 99.891 | 0.06 | <0.0005 | 89.6 | | 0.0 |
| Silicate Slag | 495.0 | 16.5 | 54.32 | | 6.45 | 10.0 | | 91.1 |
| Carbonate Slag | 93.0 | 3.1 | 10.65 | | 3.37 | 0.4 | | 8.9 |

After the cementation, the cement copper pulp was passed through a coarse screen to remove the coarse scrap iron. The material was then passed through a permanent magnet drum separator to remove the magnetic material. The nonmagnetic pulp was screened on a 48 mesh screen, using a vibrating mechanism. The minus 48 mesh pulp was filtered on a vacuum filter, and the cement copper washed with water and dried in an electric oven. The dry cement copper was melted in a gas-fierd, crucible melting furnace, being added in batches, and the silica was added with the last charge of cement copper. A silicate slag was then removed after which soda ash was added and a carbonate slag removed. The copper was melted and cast. It was found that the copper was suitable for the production of copper anodes, cast copper metal and cast wire bar. The results of the procedure showing the copper produced by the process of the present invention is set forth in the following charts. While these charts show a chemical analysis of the other ingredients, the copper content was determined by the even more accurate electrochemical analysis process.

It is to be understood that the analysis set forth merely indicates the benefits to be derived from the use of the present invention and is in no way to be construed as a limitation. In fact, the examples given in the specification are merely to illustrate the invention and not to limit the scope thereof as defined in the appended claims.

We claim:

1. An improved cementation copper recovery process for producing a high-grade cementation copper from a relatively low-grade copper-bearing ore comprising the steps of leaching a relatively low-grade copper-bearing oxide ore with sulfuric acid to form a copper sulfate solution having a pH of about 1 to 3;

precipitating copper from said copper sulfate solution in the presence of iron to form copper in a finely divided form;

passing the resultant mixture through a first screen to remove relatively large solids to provide a fine-grade cementation copper pulp;

passing the resulting pulp through a magnetic separator to remove magnetic materials therefrom and to produce a substantially non-magnetic pulp;

passing the non-magnetic pulp through a second screen to remove additional solids that are larger than said copper in finely divided form;

filtering the resulting material to remove the solution therefrom and to provide a high-grade cementation copper; and washing and drying the resultant filtered cementation copper.

2. An improved process for the recovery of cementation copper having a copper content above about 92% from a low-grade copper oxide ore which comprises the steps of leaching a crushed copper oxide ore having a particle size of about ⅜″ with a sulfuric acid solution to obtain a solution of copper sulfate which has a pH about 1 to about 3.

precipitating copper in finely divided form from said copper sulfate solution in the presence of iron;

passing the resultant mixture through a coarse screen having a size of about 10 mesh to remove relatively large solids therefrom and to provide a cementation copper pulp;

passing the resultant copper pulp through a magnetic separator to remove magnetic materials therefrom and to provide a substantially non-magnetic pulp;

passing the resulting non-magnetic pulp through a second screen having a screen size of about 48 mesh to remove additional solids that are larger than the copper in said non-magnetic pulp;

filtering the resulting material to remove solution therefrom; and washing and drying the resulting filtered cementation copper.

References Cited

UNITED STATES PATENTS

| | | | |
|---|---|---|---|
| 3,282,675 | 11/1966 | Parker | 75—117 |
| 3,288,598 | 11/1966 | Hogue | 75—117 |
| 3,288,599 | 11/1966 | Keyes | 75—117 |

L. DEWAYNE RUTLEDGE, Primary Examiner

T. R. FRYE, Assistant Examiner

U.S. Cl. X.R.

75—0.5, 101, 117